(12) United States Patent
Loftis et al.

(10) Patent No.: US 7,793,423 B2
(45) Date of Patent: Sep. 14, 2010

(54) PIPING ALIGNMENT TOOL

(76) Inventors: Joey Lee Loftis, 203 Oxbow Ct., Valparaiso, IN (US) 46383; Kandy Lou Loftis, 203 Oxbow Ct., Valparaiso, IN (US) 46383

(*) Notice: Subject to any disclaimer, the term of this patent is extended or adjusted under 35 U.S.C. 154(b) by 447 days.

(21) Appl. No.: 11/830,502

(22) Filed: Jul. 30, 2007

(65) Prior Publication Data
US 2009/0033921 A1 Feb. 5, 2009

(51) Int. Cl.
*G01C 15/00* (2006.01)
*G01B 11/26* (2006.01)

(52) U.S. Cl. ............ 33/286; 33/529; 33/DIG. 21; 356/138; 356/399

(58) Field of Classification Search ............ 33/227, 33/228, 276, 278–282, 285, 286, 529, 613, 33/645, DIG. 21; 356/138, 153, 399; 138/104
See application file for complete search history.

(56) References Cited

U.S. PATENT DOCUMENTS

| | | | |
|---|---|---|---|
| 4,206,550 A * | 6/1980 | Boyett et al. | 33/286 |
| 4,947,556 A * | 8/1990 | Peil | 33/370 |
| 5,568,265 A | 10/1996 | Matthews | |
| 5,653,036 A | 8/1997 | Dansereau | |
| 5,966,826 A * | 10/1999 | Ho | 33/365 |
| 6,052,911 A | 4/2000 | Davis | |
| 6,124,935 A * | 9/2000 | Matthews | 356/399 |
| 6,247,238 B1 | 6/2001 | Harvey et al. | |
| 6,266,143 B1 | 7/2001 | Peterson et al. | |
| 6,286,219 B1 | 9/2001 | Palumbo, II | |
| 6,393,708 B1 | 5/2002 | Culver et al. | |
| 6,532,676 B2 | 3/2003 | Cunningham | |
| 6,643,019 B1 | 11/2003 | Jeanneret | |
| 6,823,600 B1 | 11/2004 | Vaughan | |
| 6,941,665 B1 | 9/2005 | Budrow et al. | |
| 6,986,209 B2 | 1/2006 | Cook | |
| 7,039,089 B2 | 5/2006 | Kishi et al. | |
| 7,155,834 B2 | 1/2007 | Palumbo, III et al. | |
| 2002/0170190 A1* | 11/2002 | Wetterlind | 33/286 |

* cited by examiner

*Primary Examiner*—Amy Cohen Johnson
(74) *Attorney, Agent, or Firm*—Hartman & Hartman, P.C.; Gary M. Hartman; Domenica N.S. Hartman

(57) ABSTRACT

A piping alignment tool suitable for locating where an extension of an existing pipe must pass through obstructions such as walls. The tool has a tubular shape with oppositely disposed ends. Each end is formed to have multiple coaxial sets of different-sized pipe threads that allow the tool to be threaded onto a pipe having one of the pipe thread sizes formed on the tool. The tool is also equipped to generate light beams from each end, so that the light beam can be emitted from an end of the tool opposite a pipe onto which the tool has been threaded. By threading the tool onto a pipe and emitting a light beam from the end of the tool opposite the pipe, the location of an obstruction beyond the existing pipe is illuminated by the emitted light beam.

17 Claims, 1 Drawing Sheet

PIPING ALIGNMENT TOOL

CROSS REFERENCE TO RELATED APPLICATIONS

This application is related to U.S. Provisional Application No. 60/833,283, filed Jul. 25, 2006, the contents of which are incorporated herein by reference.

BACKGROUND OF THE INVENTION

The present invention generally relates to methods and tools employed to install piping materials. More particularly, this invention relates to a tool and method that enables the installation of a variety of pipes over long expansions with potential obstructions, such as through a building with multiple rooms, while minimizing the time required to ensure accurate installation and avoid making mislocated holes in obstructions.

Locating suitable routes for pipes of a piping system can be challenging if the piping system is to be installed over long distances, as is the case with sprinkler systems that extend across and between rooms of a large facility. Whether under construction or completed, facilities in which piping systems are installed often have structural hindrances, such as walls, I-beams, sub-floors, drywall, concrete, etc., that are obstacles to individuals laying the pipe. Because all of the pipe must be connected, it is inevitable that certain obstructions must be penetrated or removed. In the likely event that an obstruction cannot be removed, a passage through the obstruction must be formed. This task is complicated in situations where the piping system must be substantially level between its starting and finishing points, gauged by maintaining added extensions the same distance from the floor, ceiling, or adjacent walls as a proceeding pipe section. At least two installers typically work together, one to measure the opening of an existing pipe where the next pipe extension will be installed, while the other determines the future location of the pipe extension and where any obstructions must be penetrated by the extension in order to pass through the obstructions. The necessity for accuracy requires a time-consuming task of measuring and remeasuring. If only one installer is available, this task is made much more difficult as he or she bears the entire burden of making the necessary measurements.

Various tools have been proposed whose function is to simplify achieving a desired alignment and orientation of materials in construction projects, including piping systems. U.S. Pat. No. 4,947,556 to Peil discloses a plumber's level equipped with level vials (bubbles) for leveling or plumbing a pipe section. The level is formed to have three concentric sets of different-sized pipe threads at opposite ends of the level, with one set at one end and two sets at the opposite end, allowing the level to be threaded onto any pipe with one of the three pipe thread sizes formed on the level. U.S. Pat. Nos. 5,568,265 and 6,124,935 to Matthews disclose pipe fitting alignment tools that emit a light beam from one of two oppositely-disposed ends. The end of the tool opposite the light beam may be formed to have multiple sets of threads or other type of fitting for mounting the tool on the end of an existing pipe. By securing the fitting end of the tool to an existing pipe, the tool can project a light beam on surfaces that an extension of the pipe must pass through, such as a wall or other obstruction. Though not adapted for installing piping, U.S. Pat. No. 4,206,550 to Boyett et al. discloses another example of using a light beam in a construction project. Boyett et al. disclose a plumbing device that is mounted in a gimbal system and emits a light beam from each of two oppositely-disposed ends for generating spots of light on surfaces vertically above and below the device.

By insuring accurate orientation within the alignment of a piping system being installed, the tools disclosed by Peil and Matthews reduce installation time by eliminating the need to measure distances numerous times to get the desired point of entry into an obstruction that the pipe must pass through, and also allow piping installation to be performed by a single individual. However, further improvements in piping installation methods and tools would be desirable

BRIEF SUMMARY OF THE INVENTION

The present invention provides a piping alignment tool suitable for locating where an extension of an existing pipe must pass through obstructions such as walls. The tool has a tubular shape with oppositely disposed ends. Each end is formed to have multiple coaxial sets of different-sized pipe threads that allow the tool to be threaded onto any pipe with one of the pipe thread sizes formed on the tool. The tool is also equipped to generate a light beam from each end, so that a light beam can be emitted from an end of the tool opposite a pipe onto which the tool has been threaded. By threading the tool onto a pipe and emitting a light beam from the end of the tool opposite the pipe, the location of an obstruction beyond the existing pipe is illuminated by the emitted light beam.

In view of the above, it can be seen that a significant advantage of this invention is that the tool can be configured as a lightweight, all-in-one assembly with multiple different threaded pipe sizes, such as sizes commonly used for sprinkler fittings and other piping systems. Based on the National Pipe Thread convention, which is a U.S. standard for tapered (NPT) or straight (NPS) threads used to join pipes and fittings, common threaded pipe sizes have nominal diameters of ⅛, ¼, ⅜, ½, ¾, 1, 1¼, 1½, and 2 inches (about 3.175, about 6.35, about 9.525, about 12.7, about 19.05, about 25.4, about 31.75, about 38.1, and about 50.8 mm)). Because both ends of the tool have multiple different thread sizes and the ability to project a light beam, one end of the tool can be readily attached to an existing pipe and the light beam projected from the opposite end to illuminate locations across a distance where the extensions of the existing pipe must be extended, and where obstructions exist that must be penetrated.

Other objects and advantages of this invention will be better appreciated from the following detailed description.

DETAILED DESCRIPTION OF THE INVENTION

Figure 1:
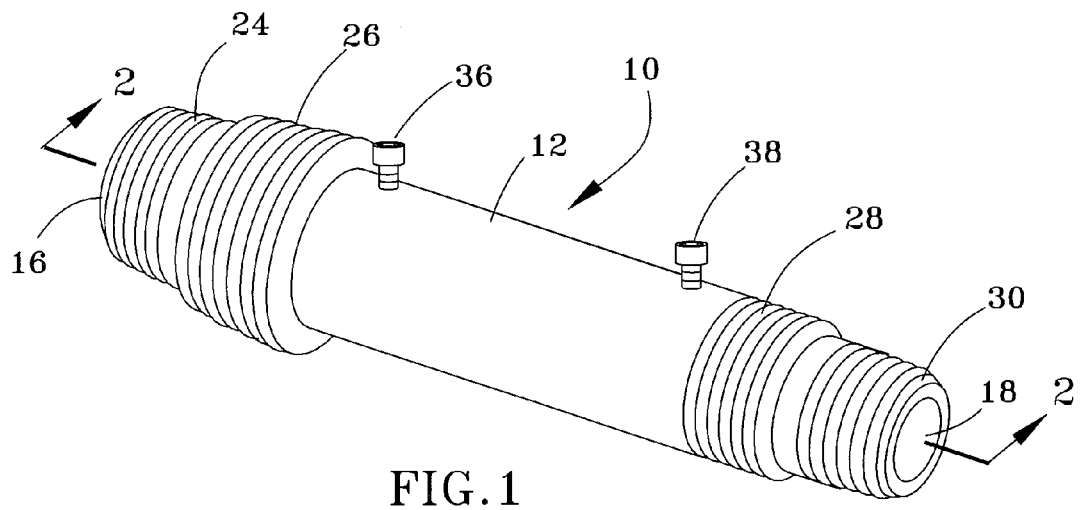
FIG. 1 is a perspective view of a piping alignment tool in accordance with a preferred embodiment of this invention.
Figure 2:
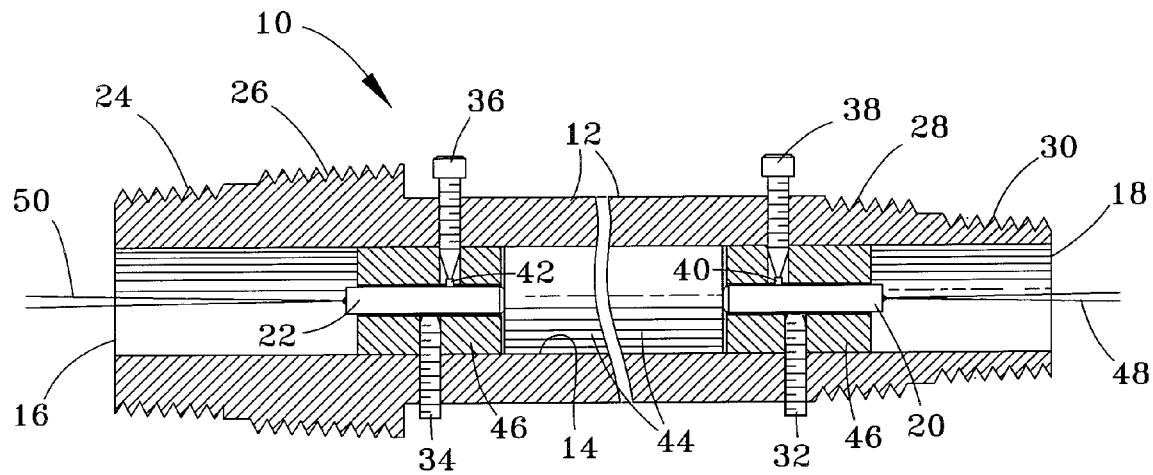
FIG. 2 represents a cross-sectional view of the piping alignment tool of FIG. 1.
Figure 3:
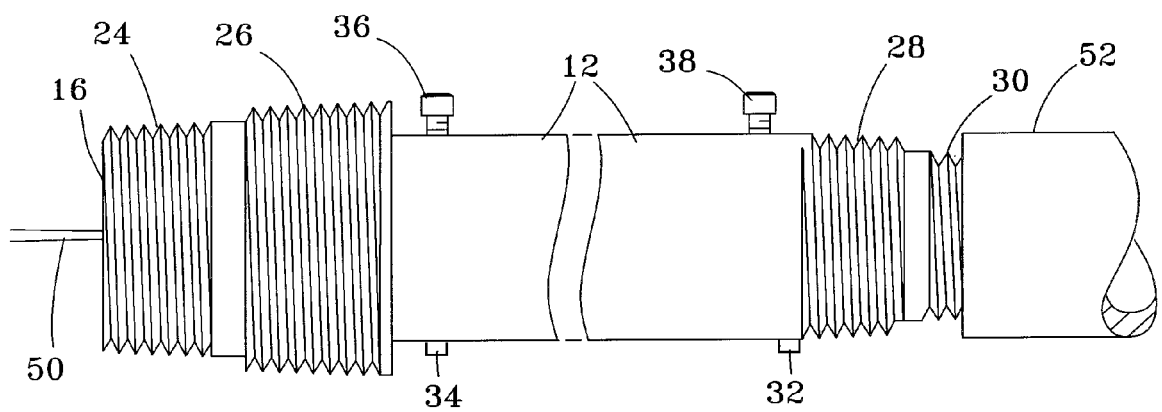
FIG. 3 represents the piping alignment tool of FIG. 1 threaded onto an existing pipe.

Illustrated in FIGS. 1 through 3 is a piping alignment tool 10 suitable for use when installing a piping system, such as sprinkler, plumbing, sewer, or shipyard piping system. The tool 10 is shown configured as a one-piece unit having a generally tubular shape, in that the body 12 of the tool 10 has a cylindrically-shaped exterior, a hollow interior cavity 14 extending along the longitudinal axis of the tool 10, and two oppositely-disposed open ends 16 and 18. Two concentrated light beam generators 20 and 22 are disposed in the cavity 14 and oriented to project light beams 48 and 50 in opposite directions through the open ends 16 and 18 of the body 12 and along paths that coincide with the longitudinal axis of the tool 10. The light beams 48 and 50 produced by the generators 20 and 22 are preferably concentrated and collimated, as is the case with laser beams, and various laser beam generators are commercially available that could be suitable for use with the invention. A battery 44 is disposed within the cavity 14 between the generators 20 and 22, and is electrically connected to contacts (not shown) on the generators 20 and 22, such that operation of the generators 20 and 22 is controlled by an on/off button 40 and 42, respectively. A pair of thumbscrews 36 and 38 are threaded into the tool body 12 and are of sufficient length to engage the on/off buttons 40 and 42, such that the light beams 48 and 50 can be generated by either or both generators 20 and 22 by simply turning the appropriate thumbscrew 40 and/or 42.

Two sets of two coaxial male threads 24, 26, 28, and 30 are formed on the exterior of the body 12 at the open ends 16 and 18. The four threads 24, 26, 28, and 30 differ in size (diameter) from each other, allowing the tool 10 to be threaded into pipes with complementary female threads to the four different thread sizes on the tool 10. While the aforementioned standard NPT sizes are preferred for the threads 24, 26, 28, and 30, the invention is not limited to any particular thread sizes. However, for use in sprinkler systems, preferred thread sizes for the threads 24, 26, 28, and 30 are believed to be nominal diameters of ½, ¾, 1¼, and 1 inches (about 12.7, about 19.05, about 31.75, and about 25.4 mm), respectively. Furthermore, though the threads 24, 26, 28, and 30 are preferably male, it is foreseeable that the threads 24, 26, 28, and 30 could instead be female threads or a combination of male and female threads. At least those portions of the tool body 12 forming the threads 24, 26, 28, and 30 are preferably fabricated from a material that will resist wear when the threads 24, 26, 28, and 30 are repeatedly threaded in and out of threads formed on a pipe. While iron-based metals are common materials for piping systems and therefore also suitable for the tool body 12 and threads 24, 26, 28, and 30, other materials could be used.

The generators 20 and 22 are preferably centrally located within the cavity 14 of the tool body 12 by any suitable type of spacers or packing 46 as shown, and secured with setscrews 32 and 34 that are threaded into the tool body 12, through the packing 46, and into engagement with the generators 20 and 22. The setscrews 32 and 34 can be backed off to enable insertion and removal of the generators 20 and 22 through their respective open ends 16 and 18 of the tool 10, as well as permit replacement of the battery 44. While the setscrews 32 and 34 are preferred because they provide an uncomplicated method of securing the generators 20 and 22, it should be apparent that a variety of other means could be employed to releasably secure the generators 20 and 22 within the tool 10.

With the construction and function of the tool 10 as described above, by threading the appropriate end 16/18 of the tool 10 onto an existing pipe of a piping system, for example, threading the smaller threads 24 on the end 16 into a pipe 52 as shown in FIG. 3, the longitudinal axis of the tool 10 and the path of a light 50 projected from the opposite end 18 of the tool 10 automatically coincide with the axis of the pipe 52. Therefore, once the tool 10 is fastened firmly into place, the appropriate thumbscrew 38 (opposite the end 16 of the tool 10 threaded into the pipe 52) can be turned to engage the on/off button 42 of its generator 22 and generate a collimated light beam 50 from the end 18 of the tool 10. The light beam 50 is conducted along a straight path that precisely illuminates the path of any extension to be installed on the pipe 52, as well as any obstructions along that path that must be penetrated in order to continue lengthening of the pipe 52. The location of an obstruction illuminated by the light beam 50 can then be marked to identify where a hole must be formed through the obstruction to allow passage of the pipe extension. Thereafter, the light generator 22 can be turned off with its thumbscrew 38. As such, the tool 10 provides a process that is far simpler and more reliable than the time-consuming practice of measuring the location of an existing pipe 52 and transferring the measurements to obstructions along the planned path for extensions of the pipe 52.

While the invention has been described in terms of a preferred embodiment, it is apparent that other forms could be adopted by one skilled in the art. For example, the physical configuration of the tool 10 could differ from that shown, and materials and processes other than those noted could be use. Therefore, the scope of the invention is to be limited only by the following claims.

The invention claimed is:

1. A piping alignment tool suitable for locating a path along which an extension of an existing pipe must pass, the tool comprising:

a tubular shape with a longitudinal axis and oppositely-disposed open first and second ends, each of the first and second ends having multiple coaxial sets of different-sized pipe threads that enable the tool to be threaded onto a pipe with one of the different-sized pipe threads and orient the tool so that the longitudinal axis of the tubular shape is coaxial with the pipe;

means for generating a first light beam from the first end of the tubular shape and means for generating a second light beam from the second end of the tubular shape;

first and second spacers disposed within the tubular shape and removable through at least one of the first and second ends of the tubular shape, the first and second spacers having central openings in which the first and second light beam generating means are disposed such that the first and second light beam generating means are removable from the tubular shape with their respective first and second spacers and centered by their respective first and second spacers within the tubular shape, and such that their respective first and second light beams are emitted along a path coinciding with the longitudinal axis of the tubular shape so as to illuminate the path and any obstructions in the path, the first and second spacers being longitudinally spaced apart within the tubular shape so as to define a compartment therebetween;

at least one battery disposed within the compartment between the first and second spacers and retained within the tubular shape and maintained in electrical contact with the first and second light beam generating means by the first and second spacers;

means for retaining the first and second spacers within the tubular shape and thereby retain the battery and their respective first and second light beam generating means within the tubular shape; and means for selectively energizing and de-energizing the first and second light beam generating means so that the first light beam can be emitted from the first end of the tubular shape when the second end of the tubular shape is threaded onto the pipe and alternatively the second light beam can be emitted from the second end of the tubular shape when the first end of the tubular shape is threaded onto the pipe.

2. The piping alignment tool according to claim 1, wherein the different-sized pipe threads comprise male threads.

3. The piping alignment tool according to claim 2, wherein the different-sized pipe threads have nominal diameters of one-half inch, three-quarters inch, one inch, and one and one-quarter inch.

4. The piping alignment tool according to claim 1, wherein each of the first and second ends of the tubular shape have two coaxial sets of the different-sized pipe threads.

5. The piping alignment tool according to claim 1, wherein each of the first and second light beam generating means is a laser beam generator.

6. The piping alignment tool according to claim 1, wherein the energizing and de-energizing means comprises:
   thumbscrews threaded into the tubular shape, through the first and second spacers, and oriented transverse to the longitudinal axis of the tubular shape; and
   switches on the first and second light beam generating means that are operable by threading the thumbscrews into the tubular shape and through the first and second spacers.

7. The piping alignment tool according to claim 1, wherein the energizing and de-energizing means are disposed between the multiple coaxial sets of different-sized pipe threads at the first end and the multiple coaxial sets of different-sized pipe threads at the second end of the tubular shape.

8. The piping alignment tool according to claim 1, wherein both of the first and second spacers and both of the first and second light beam generating means are removable through both of the first and second ends of the tubular shape.

9. The piping alignment tool according to claim 1, wherein the retaining means comprises setscrews threaded into the tubular shape, through the first and second spacers, and engaged with the first and second light beam generating means.

10. The piping alignment tool according to claim 1, wherein the retaining means are disposed between the multiple coaxial sets of different-sized pipe threads at the first end and the multiple coaxial sets of different-sized pipe threads at the second end of the tubular shape.

11. A piping alignment tool adapted to locate a path along which an extension of an existing pipe must pass, the tool comprising:
   a tubular shape with a longitudinal axis and a continuous cavity that defines first and second openings at oppositely-disposed first and second ends of the tubular shape, each of the first and second ends having multiple coaxial sets of different-sized male pipe threads that enable the tool to be threaded into a pipe with one of the different-sized male pipe threads and orient the tool so that the longitudinal axis of the tubular shape is coaxial with the pipe;
   first and second laser beam generators oriented within the continuous cavity of the tubular shape to emit first and second laser beams from the first and second openings of the tubular shape;
   first and second spacers disposed within the continuous cavity of the tubular shape and removable through each of the first and second openings of the tubular shape, the first and second spacers surrounding the first and second laser beam generators such that the first and second laser beam generators are removable from the continuous cavity with their respective first and second spacers and centered by their respective first and second spacers within the tubular shape, and such that their respective first and second laser beams are emitted along a path coinciding with the longitudinal axis of the tubular shape so as to illuminate the path and any obstructions in the path, the first and second spacers being longitudinally spaced apart within the continuous cavity so as to define a compartment therebetween;
   at least one battery disposed within the compartment between the first and second spacers and electrically connected to the first and second laser beam generators;
   means for retaining the first and second spacers within the continuous cavity of the tubular shape and thereby retain the battery and their respective first and second laser beam generators within the continuous cavity; and
   means for selectively energizing and de-energizing the first and second laser beam generators so that the first laser beam can be emitted from the first opening of the tubular shape when the second end of the tubular shape is threaded onto the pipe and alternatively the second laser beam can be emitted from the second opening of the tubular shape when the first end of the tubular shape is threaded onto the pipe.

12. The piping alignment tool according to claim 11, wherein the different-sized male pipe threads have nominal diameters of one-half inch, three-quarters inch, one inch, and one and one-quarter inch.

13. The piping alignment tool according to claim 11, wherein each of the first and second ends of the tubular shape have two coaxial sets of the different-sized male pipe threads.

14. The piping alignment tool according to claim 11, wherein the energizing and de-energizing means comprises:
   thumbscrews threaded into the tubular shape and through the first and second spacers; and
   switches on the first and second laser beam generators that are operable by threading the thumbscrews into the tubular shape and through the first and second spacers.

15. The piping alignment tool according to claim 11, wherein the retaining means comprises setscrews threaded into the tubular shape and into the first and second spacers.

16. The piping alignment tool according to claim 11, wherein the first and second spacers retain the battery within the continuous cavity and maintain the battery in electrical contact with the first and second laser beam generators.

17. The piping alignment tool according to claim 11, wherein the battery is removable through both of the first and second openings of the tubular shape.

* * * * *